Patented Jan. 19, 1954

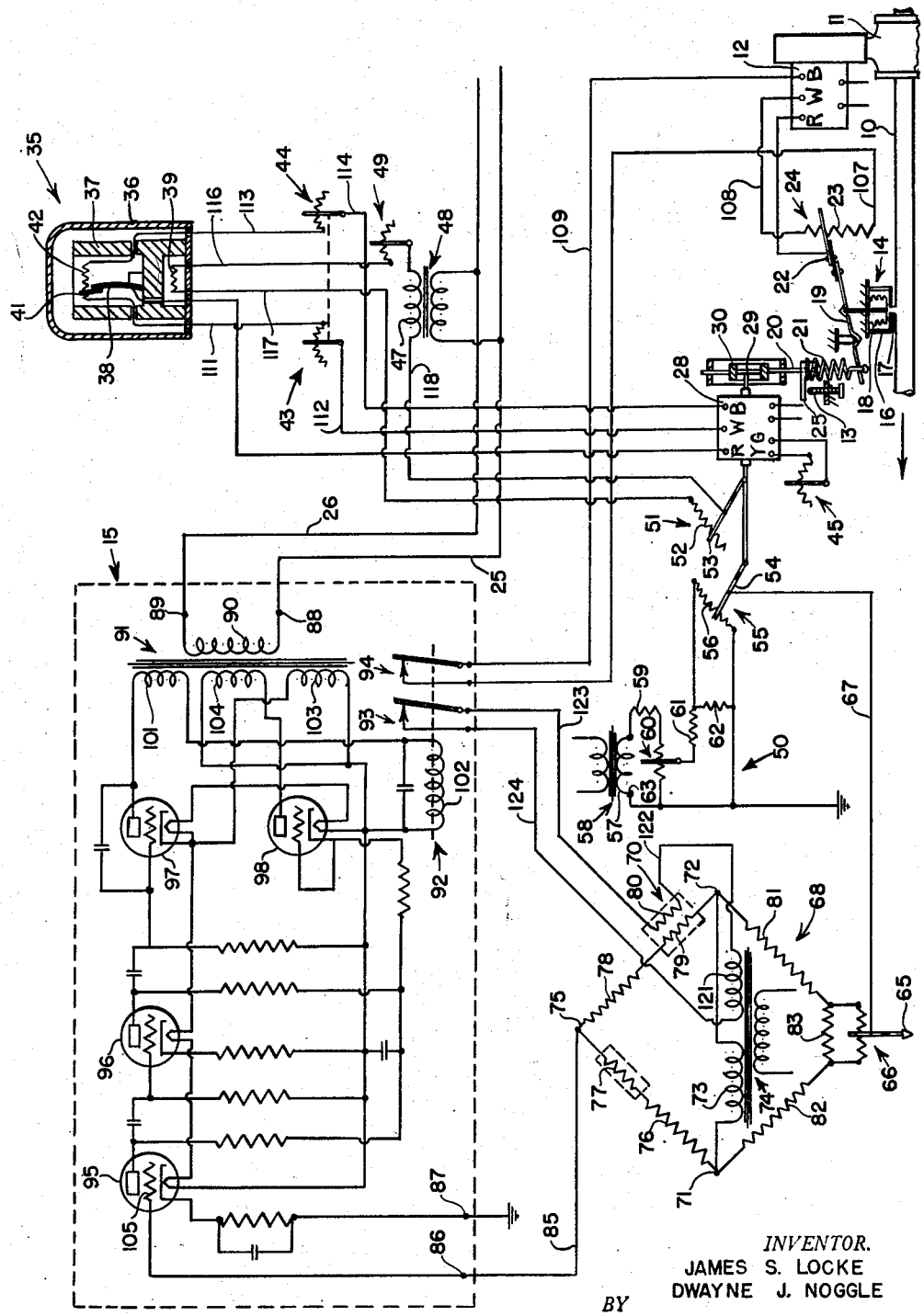

2,666,586

UNITED STATES PATENT OFFICE 2,666,586

TEMPERATURE CONTROL APPARATUS FOR STEAM HEATING SYSTEMS

James S. Locke and Dwayne J. Noggle, Minneapolis, Minn., assignors to Minneapolis-Honeywell Regulator Company, Minneapolis, Minn., a corporation of Delaware Application March 23, 1949, Serial No. 83,026

13 Claims. (Cl. 236—68)

This invention relates to control apparatus for steam heating systems.

Because of the restricted range of temperatures at which steam can be used in a heating system, difficulty is experienced in satisfactorily controlling a steam heating system over widely varying load conditions. This is especially true in large systems having a multiplicity of rooms or zones which add distribution problems to the other difficulties. To overcome these problems, and as a principal object of this invention, a dual function control system is provided which modulates the supply of steam for medium and heavy heating loads and cycles the steam supplied for lighter loads.

It is another object to provide a steam heating control system including an improved cycler adjustable in response to the load on the system.

It is also an object to provide a modulating control apparatus for a steam heating system which is responsive to conditions indicative of the heating load and wherein the modulating control apparatus is in constant control of a cycler which assumes control of the system under predetermined conditions.

It is an additional object to provide apparatus for controlling a steam valve including a pressure control device automatically adjusted in accordance with load demand by an adjusting or reset motor and wherein the motor simultaneously adjusts a cycler which controls a connection between said pressure control device and the valve.

It is a further object to provide control apparatus for a steam heating system combining modulating control and cycler control wherein, when on cycler control, the apparatus may operate initially to fully open the steam valve to insure good distribution, and then tend to throttle the supply to maintain predetermined low limit conditions, these operations occurring with each cycle.

It is an additional object to provide control apparatus for a steam heating system including a network circuit having a temperature responsive resistor arranged to be heated in accordance with the heat supplied to the system when on cycling control, the network circuit being connected in control of an amplifier which in turn is connected in control of a device regulating the steam supply.

It is a somewhat similar object to provide controls for a heating system including a cycler adjusted in accordance with the heat load and connected in a manner to override the modulating control apparatus normally in control of the system.

It is also an object to provide control apparatus for a heating system wherein a proportioning motor controlled in response to the heating load is used to adjust a controller for the system and simultaneously adjusts a device for modifying the response of the load responsive control means and also adjusts a cycler device arranged to override the controller.

These and other objects will become apparent upon a study of the following specification and drawing, the single figure of the drawing showing a schematic representation of the present control apparatus.

In the drawing, steam is supplied from a suitable source through main 10 to a distributing system, neither the source nor system being shown, the steam flow being controlled by a valve 11 operated by a geared motor 12. Motor 12 is a conventional proportioning control motor incorporating a gear train, a follow-up potentiometer and a sensitive balanced relay, as described in Taylor Patent 2,028,110, issued January 14, 1936. Motor 12 is controlled by a pressure responsive devise 14 and an electronic relay 15. Device 14 responds to the pressure in main 10 between valve 11 and the distributing system, not shown, and includes an enclosed chamber 16 connected to main 10 by tube 17 and sealed from the atmosphere by a bellows 18. Bellows 18 is arranged to operate a pivoted lever 19 in opposition to spring 21, lever 19 having attached thereto a wiper 22 movable over resistor 23, the potentiometer 24 thus described being used to control motor 12. A low limit adjustment for device 14 is obtained by stop screw 13 arranged to engage a projecting flange of spring attachment collar 25, said attachment collar 25 being slideable on rod 20 of cross head structure 30. The lower end of said rod is enlarged to retain collar 25 and thus permits continued operation of motor 28 after the low limit adjustment of device 14 is reached.

As will be described in detail later, device 14 tends to control motor 12 and valve 11 in a manner to maintain a predetermined pressure, or narrow range of pressures, in main 10 and the particular pressure, or narrow range of pressures, depends upon the tension of spring 21. Instead of being manually adjusted, as in the conventional pressure control, spring 21 is adjusted by an adjusting or reset motor 28, motor 28 being generally similar to motor 12. Motor 28 adjusts spring 21 by means of a cam 29 coacting with a suitable cross head structure 30, the cam 29 being constructed with a sufficient eccentricity to adjust device 14 through the entire range of steam pressures usable in the heating system. Obviously, device 14 may be arranged to respond to the differential of main and return pressure, if desired.

Motor 28 is controlled in response to weather conditions by an outside controller 35 in a representative location outside the building being heated. Controller 35 includes an outer metallic casing 36, an inner hollow block 37 of considerable thermal mass, such as a block of cast iron, a bimetal or like temperature responsive element 38, and a heater 39 located in a recess in the block 37. Bimetal 38 adjusts wiper 41 over resistor 42 as the resultant temperature of device 35 varies over a relatively wide range. The position of motor 28 relative to any particular temperature of device 35 may be adjusted by the coupled rheostats 43 and 44, and the travel of motor 28 for a predetermined change in the temperature of device 35 may be adjusted by rheostat 45 connected to the Y and G terminals of said motor and thus connected in shunt relation to the follow-up potentiometer of the motor. By varying the setting of rheostat 45, the rebalancing ability of the follow-up potentiometer of motor 28 is varied.

So that controller 35 may respond to weather conditions in the same manner that a building normally does, heater 39 is provided, this heater being energized by a circuit including secondary winding 47 of transformer 48, a manually adjustable rheostat 49 and a rheostat 51 having a nonlinear resistor 52 swept over by wiper 53, wiper 53 being adjusted in accordance with the operation of motor 28. This latter rheostat is so arranged that a relatively low degree of heat is supplied device 35 in mild weather and a greater amount of heat is furnished in more severe weather so that the effects of wind on device 35 will simulate the effects of said wind on the building being heated. As is well known, in devices of this type, the response to wind occurs because of the tendency of wind to carry away heat from the device in the same manner that it tends to carry away heat from a building. Obviously, the wind is more effective in lowering the temperature of a building in cold weather than it is in relatively mild weather, hence, by providing additional heat during the colder weather a greater temperature change can be caused by the action of wind on device 35 than would be the case if the device was uniformly heated. The rheostat 49 is a manually adjustable device used for calibrating or setting the apparatus to maintain a predetermined temperature in the building based on the conditions outside and for establishing the fade out point for the system.

In addition to adjusting rheostat 51, motor 28 also adjusts a potentiometer 55, this device comprising a resistor 56 and a wiper 54 adjusted simultaneously with wiper 53 and cam 29. Potentiometer 55 forms part of a voltage adding network circuit 50 energized from secondary winding 57 of a transformer 58, secondary winding 57 being connected through a fixed resistor 59 and the resistor of a potentiometer 60 to form a closed circuit. The wiper of potentiometer 60 is connected through a fixed resistor 61 and a similar resistor 62 to form another closed circuit, resistor 56 of potentiometer 55 being connected in parallel with resistor 62. The left terminal of transformer secondary winding 57 and a portion of each of the aforementioned closed loops are grounded so that the wiper of potentiometer 60 is at a voltage above ground potential depending upon its adjustment, it being at ground potential when at its left extreme and at its maximum potential when at its right extreme. Likewise, wiper 54 is at ground potential when at the bottom of resistor 56 and is at its maximum potential, a predetermined fraction of the voltage above ground of the wiper of potentiometer 60, when at the upper end of resistor 56. Wiper 57 is connected to wiper 65 of potentiometer 66 by a wire 67, wiper 65 constituting one of the output terminals of a network circuit generally identified by the numeral 68. This output terminal of the network 68 would normally be grounded but, due to the aforementioned voltage adding network 50, the potential of wiper 65 may be varied from ground to a predetermined value above ground.

Network 68 comprises input terminals 71 and 72 connected to secondary winding 73 of a transformer 74 and the aforementioned wiper 65 forms one output terminal of the network and terminal 75 forms the other output terminal of the network. The upper left hand branch of the network comprises a fixed resistor 76 having a negligible temperature coefficient of resistance and fixed resistor 77 having an appreciable temperature coefficient of resistance, resistor 77 being provided for compensating the network for changes in ambient temperature. The upper right hand branch of the network comprises fixed resistor 78 and fixed resistor 79, resistor 79 having an appreciable temperature coefficient of resistance and being arranged in close proximity to heater 80, resistors 79 and 80 being preferably surrounded with either insulating material or material having an appreciable heat capacity to thus form a lagging to retard the rate of temperature change of resistor 79 in response to heating by heater 80. For convenience, resistor 79, heater 80 and the associated lagging are assembled to form a plug in unit or element 70, thus permitting easy exchange of elements having different time constants to meet the needs of various installations. The lower right hand branch of network 68 comprises a fixed resistor 81 and the lower left hand branch a fixed resistor 82, both of these resistors having negligible temperature coefficients of resistance. The lower branches of the bridge are connected by a resistor 83 connected in shunt relation with the resistor of potentiometer 66 to thereby lessen the authority of potentiometer 66. The present use of potentiometer 66 will be recognized as a conventional arrangement for varying the balance of the network for calibration and the like.

Output terminal 75 of network 68 is connected by wire 85 to input terminal 86 of an electronic amplifier and relay device 15, the other input terminal 87 being grounded. Electronic relay 15 is supplied with current to input terminals 88 and 89 by line wires 25 and 26 connected to a suitable source of electricity, the terminals also being connected to primary winding 90 of transformer 91. Amplifier 15 is a rather conventional one and comprises two dual triode discharge devices, shown in the drawing as 4 vacuum tubes, and a relay 92 including switches 93 and 94. Discharge devices, or tubes, 95 and 96 comprise one of the dual triodes and devices 97 and 98 comprise the other dual triode. Secondary winding 101 of transformer 91 provides the plate voltage for device 97 and is connected through the winding 102 of relay 92 for operation thereof. Secondary winding 103 of transformer 91 is used to energize the heaters of the discharge devices and also to provide a bias on device 97, and winding 104 of transformer 91 operates through triode 98 connected as a rectifier to provide a direct current bias voltage on the plate circuits of the devices 95 and 96. With an amplifier of this sort, relay 92 is pulled in and switches 93 and 94 are closed when a sufficient positive signal is impressed on the control element 105 of the devices 95 and the relay is deenergized and switches 93 and 94 are opened when there is no signal or a negative signal impressed on the control element 105.

As shown, the primary winding of transformer 48 is connected to line wires 25 and 26, and the current supply terminals for motors 12 and 28 are connected to a suitable low voltage source, not shown.

To better show the function of the above described apparatus, its operation will now be discussed.

*Operation*

For the purpose of this illustration, the apparatus in the drawing is shown in a position corresponding to a relatively mild weather condition such as an outside temperature of about 50° with a negligible wind blowing, this condition being chosen for illustration only and being assumed as requiring slightly more than 20% capacity from the steam heating system. Thus, wiper 41 is about ⅕ of the way across resistor 42 hence wipers 53 and 57 of rheostat 51 and potentiometer 55 are about ⅕ of the way from the left or lower extremes of their resistors 52 and 56, respectively. Likewise, cam 29 is in a position to cause a cross head 30 to exert relatively little pull on spring 21 so that a fairly low pressure in main 10 is sufficient to overcome spring 21 and advance wiper 22 across resistor 23. In the position shown, assume that valve 11 is in a position permitting only about 20% of its full flow of steam through main 10, and device 14 is responding to a pressure only slightly above its low limit adjustment. Under the conditions stated and with the apparatus in equilibrium, no changes will take place unless there is a change in the outside weather conditions or unless there is a change in the pressure of steam being supplied to main 10. Assuming that the steam pressure increases, without any increase in heating load, the first effect of the increase in steam pressure is to further compress bellows 18 and to rotate lever 19 in a counterclockwise direction, thus moving wiper 22 further upwardly across resistor 23. This movement of wiper 22 increases the resistance in the branch of the network circuit controlling motor 12 including wire 107, switch 94, and wire 109 to the B terminal of the motor, and diminishes the resistance in the part of the circuit including wire 108, connected to the W terminal of said motor, thus tending to drive valve 11 in a further closing direction. Likewise, if the pressure in main 10 should diminish below the desired value for the particular load conditions, spring 21 would then cause a clockwise movement of lever 19 and a consequent opening of valve 11 to supply more steam.

If the weather conditions effecting outside controller 35 should now cause a reduction in temperature at bimetal 38, either by a lower outside temperature, by less solar radiation, or by increased wind cooling device 35, then bimetal 38 will advance wiper 41 to the right across resistor 42. This movement will tend to increase the resistance in the leg of the network circuit controlling motor 28 including the left portion of resistor 42, wire 111, rheostat 43, and wire 112 to the W terminal of motor 28 and diminish the resistance in the leg of the circuit including the right portion of resistor 42, wire 113, rheostat 44, and wire 114 to the B terminal of motor 28. This will cause motor 28 to rotate sufficiently to rebalance the network, as described in the aforementioned Taylor patent, motor 28 rotating cam 29 to raise cross head 30 to thereby increase the tension of spring 21, the motor also advancing wipers 53 and 54 to the right across resistors 52 and 56. The immediate effect of increasing the tension of spring 21 is to move lever 19 in a counterclockwise direction and thereby cause an opening movement of valve 11 to increase the flow of steam to the heating system. Also, the movement of wiper 53 to the right across resistor 52 increases the energization of heater 39 by the circuit: secondary winding 47 of transformer 48, manual rheostat 49, wire 116, heater 39, wire 117, resistor 52, wiper 53, and wire 118 back to secondary winding 47. By increasing the energization of heater 39, the response of device 35 to the change in weather conditions is increased in proportion to the increase in heat load caused by the changed weather. Obviously, this response can be varied by adjustment of the manually operated rheostat 49, especially upon installation of the system, but once this rheostat is adjusted for a particular installation, it should not need further attention thereafter. A further adjustment is provided by means of rheostat 45 connected to the Y and the G terminals of motor 28 and thus connected across the follow up potentiometer of the motor in shunt relation. By varying the adjustment of rheostat 45, the amount of movement of motor 28 required to rebalance the controlling network can be adjusted; this adjustment also being one of those made at the time of installation of the system and seldom requires attention thereafter.

In the above discussion, it has been assumed that switch 94 of electronic relay device 15 is closed and remains closed so long as the heating load is above a predetermined proportion of the total load, such as above the assumed 20% load. As previously mentioned, amplifier 15 is controlled by a network circuit generally designated by the numeral 68 and by a voltage adding network 50 including potentiometer 55. Assume now that the primary windings of transformers 58 and 74 are connected to a suitable source of current and are so phased that at a particular instant the left hand end of secondary winding 57 and the left hand end of winding 73 are both negative, this instant being the same at which the bottom ends of secondary windings 101, 103, and 104 are also negative. It should be recognized that this assumption is made only to aid in understanding the phase relations of the alternating current used in the present circuits. Obviously, at the next half cycle instant, all of the above potentials will be reversed but the phase relations remain the same except as will appear in the explanation of network 68 and amplifier 15. With the primary winding of transformer 74 energized, by a circuit not shown, secondary winding 121 of said transformer is also energized and thereby causes a current flow through heater 80 by the circuit: winding 121, wire 122, heater 80, wire 123, switch 93 of relay 92, and wire 124 back to winding 121. As so far described, the heating load being carried is at or slightly above 20% of the full capacity of the system and relay 92 has been constantly energized. During this time, heater 80 has reached its maximum temperature and therefore temperature responsive resistor 79 has attained its full resistance. Under these conditions, the potentiometer 65 is, for example, so adjusted that output terminal 75 is above 1 volt negative relative to wiper 65 at the half cycle instant in question. If it now be assumed that potentiometer 60 is so adjusted that a 5 volt potential exists across resistor 56 of potentiometer 55, it then appears that the wiper of potentiometer 60 is positive relative to ground and that the upper end of resistor 56 is positive relative to the bottom end of the resistor, which is at ground potential. Therefore, when wiper 54 is about 20% of the distance from the bottom of the resistor 56, its potential would appear to be about 1 volt positive. With wiper 57 at a potential of 1 volt positive, and wiper 65 at the same potential, and with network 68 unbalanced to the extent of minus 1 volt, it appears obvious that the resulting output at terminal 75 is near zero and, upon reaching zero due to a slight decrease in load, no signal will be transmitted through wire 85 to control electrode 105. With no signal on control electrode 105, there is no signal imposed on discharge device 97 sufficient to overcome its bias and relay 92 thereby becomes deenergized. This causes opening of switches 93 and 94, the opening of switch 93 deenergizing heater 80 and permitting it to start cooling off. Opening switch 94 unbalances the network circuit controlling motor 12 in a direction to close valve 11 and, because operation of pressure control 14 has no effect on the network controlling motor 12 because of the open circuit at switch 94, motor 12 drives valve 11 fully closed.

Closing valve 11 and the consequent stoppage of steam flow causes wiper 22 of pressure control 14 to move to the bottom of resistor 23 and thus call for a wide open valve but, because of the open circuit at switch 94, the valve remains closed. Thus both the heater 80 and the building start cooling off upon deenergizing relay 92. The cooling of heater 80, and the consequent cooling of resistor 79 and decrease in its resistance, causes output terminal 75 to become less negative relative to output terminal 65, and as this negative unbalance diminishes below the positive potential imposed on terminal 65 by circuit 50, then the net output of circuits 50 and 68 for control of element 105 becomes positive. The rate of cooling of resistor 79, as well as the amount it must cool to cause a positive signal at terminal 75, determines the length of the "off" time of the cycle. The positive voltage now imposed on control grid 105 causes a negative signal to be imposed on the control grid of discharge device 96 and a positive signal on the control element of discharge device 97. As previously discussed, when a sufficient positive signal is imposed on discharge device 97, the device is rendered sufficiently conductive to again energize winding 102 of relay 92 and close switches 93 and 94. Closing of switch 94 again puts pressure control 14 in charge of motor 12 and, due to the previous position of device 14, motor 12 immediately starts opening valve 11.

Because the steam has been off and the system has cooled, the pressure tends to remain low in main 10 until the entire system is warmed and filled with steam, good distribution being thereby effected. However, when the pressure in main 10 tends to rise above the control point established by controller 35 and reset motor 28, or by stop screw 13, device 14 will then throttle valve 11 to hold the pressure at the aforementioned low limit value. Because this throttling comes only after the entire supply system has been warmed and good distribution achieved, the distribution tends to remain good even though the steam pressure is maintained at the low limit value. At the same time that pressure control 14 is again regulating valve 11, heater 80 is again increasing the resistance of 79 and making output terminal 75 of network 68 more negative relative to terminal 65. When terminal 75 is as much negative relative to 65 as 65 is elevated above ground by a positive potential, then the resulting output from the circuit becomes zero and relay 92 is again deenergized, thus starting another "off" period. The rate of heating of resistor 79 by heater 80, and the amount it must be heated to unbalance the bridge sufficiently to overcome the positive signal at 65 determines the "on" time of the cycle. The cycler unit 70 comprising resistor 79 and heater 80 is so designed that the minimum "on" time will be about 5 or 10 minutes, or sufficient time to insure good distribution. Obviously, assuming that a 20% load is the point at which cycling starts to take place, and this is the point at which 1 volt positive is applied to terminal 65, only a slight cooling of resistor 79 below its maximum temperature is required to render the unbalance of the network of less extent than the voltage impressed on terminal 65. Further, because the mean temperature of unit 70 is relatively high, the "off" period, that is the period during which resistor 79 is cooling, is relatively short.

If the outdoor weather conditions should further moderate and thereby cause motor 28 to move in a direction to reduce the heat supply and to advance wipers 53 and 54 downwardly across their respective resistors, it is obvious that a lesser voltage will be impressed on wiper 65, thereby tending to deenergize relay 92 and start an "off" period of a cycle. The continued motion of wipers 53 and 54 after the flange of collar 25 engages stop 13 is permitted by the lost motion connection between 15 and rod 20 and, obviously, the steam pressure setting of device 14 remains the same as before due to this stop arrangement. Assuming that the voltage at 65 is reduced to one half volt positive, it then appears that resistor 79 must cool enough that output terminal 75 is less than one half volt negative relative to 65 to again get a positive output from terminal 75 capable of energizing control element 105 in a direction to energize relay 92. As the cycler unit 70 comprising resistor 79 and heater 80 now operates at a lower mean temperature, its rate of cooling is lessened, thus increasing the length of the "off" period. As previously described, when the cooling of the cycler is sufficient to again cause a positive signal on element 105, and thereby energize the relay 92 and start an "on" period, heater 80 again warms up resistor 79 to unbalance the bridge sufficiently to drop out relay 92 and terminate the heating cycle. Because cycler 70 is now operating at a lower mean temperature, less time is required for the necessary temperature rise than was previously necessary but the heating time is much less affected by the lower mean temperature than is the cooling time, hence the "on" times are shortened slightly and the "off" times are lengthened considerably.

Assuming that network 68 is balanced when resistor 79 is at ambient temperature, and that wiper 54 reaches the bottom of resistor 56 when the outside conditions are such that no heating is required, there is then no positive voltage impressed on output terminal 65. With terminal 65 at ground potential and no unbalance in network 68, there is no signal on control element 105 to cause operation of electronic relay 15, relay 92 remains deenergized, switch 94 remains open and motor 12 is driven in a direction to close valve 11 because of the open circuit in one side of its control network, hence the heating system remains "off" until the demand for heat increases.

Briefly, the present control system operates to establish a desired steam pressure for a steam heating system based on outside weather conditions and maintains a correct pressure for any particular weather conditions down to a percentage of load beyond which good distribution can no longer be obtained due to the diminished steam pressure. At this point, the system is then cycled by a cycler controlled in accordance with outside weather conditions in a manner to give at least a predetermined minimum "on" period and a variable "off" period depending upon the load. When on cycler control, the control system first operates the steam valve to a wide open position and subsequently throttles it to maintain a predetermined low limit of pressure, thereby assuring good distribution of the steam, and with overheating being prevented by operation of the cycler.

As many substitutions and equivalents will become apparent upon a study of the foregoing disclosure, the scope of this invention should be determined only by the appended claims.

We claim:

1. Control apparatus for a steam heating system comprising a motor actuated valve means for regulating the supply of steam to said system, the motor of said valve means being of a type capable of operating to various positions in accordance with the adjustment of a control impedance, a pressure responsive electrical impedance device arranged to respond to the pressures in said system, circuit means connecting said device in controlling relation to said motor actuated valve means, a means responsive to a condition indicative of the load on said system, said means including a potentiometer adjusted in response to said condition, a proportioning motor arranged to adjust said pressure responsive device and connected to said potentiometer for control thereby, an electrical impedance also adjusted by said proportioning motor, a switching means connected to control at least a part of said circuit means in a manner to permit normal control of said valve means or to effectively bias said valve means to a closed position, a cycler for operating said switching means to "on" and "off" positions, said cycler being adjustable to vary the relative times the switching means is in each of said positions, and additional electric circuit means connecting said motor adjusted impedance in controlling relation to said cycler for adjusting the rate of cycling of said cycler.

2. Apparatus for controlling a heating system supplied with steam through a main and comprising a motor actuated valve means for controlling flow through the main, control means responsive to the pressures in said system downstream from said valve, signal transmitting means connecting said pressure responsive means in controlling relation to said valve means, means responsive to a condition indicative of the heating load on the system, motor means controlled by said load responsive means for adjusting said pressure responsive means, electrical impedance means adjustable by said motor means simultaneously with the adjustment of said pressure responsive means, cycler means including switching means connected in controlling relation to said signal transmitting means, said switching means being operable to provide for control of said valve means by said pressure responsive means or to bias said valve means closed, and electric circuit means connecting said impedance means in controlling relation to said cycler means.

3. Control apparatus for a steam heating system comprising, in combination, a motor actuated means for controlling the supply of steam to said system, a pressure responsive control device responsive to the pressures in said system downstream from said motor actuated means, signal transmitting means connecting said device in controlling relation to said motor actuated means, means responsive to a condition indicative of the heat load of said system, motor means arranged for adjusting said pressure responsive device, means connecting said condition responsive means in controlling relation to said motor means in a manner to cause said motor means to adjust said device in accordance with said heat load, cyclically operable switch means connected in controlling relation to said signal transmitting means for cyclically terminating said supply, and gradually adjustable means including a control circuit connecting said motor means in adjustable controlling relation to said cyclically operable switch means to thereby vary the rate of cycling of said cyclically operable switch means.

4. Control apparatus for a steam heating system comprising means for regulating the supply of steam to said system, adjustable pressure responsive means responding to a differential pressure of the steam in said system, said pressure responsive means being connected in controlling relation to said regulating means for maintaining, at any particular adjustment, a predetermined differential pressure of steam, proportional motor means for adjusting said pressure responsive device, means responsive to a condition indicative of the load on such steam heating system for proportionally controlling said motor means, adjustable cycler means, means connecting said cycler means in operative relation to said regulating means in a manner to cyclically restrict said supply of steam, and means connecting said load responsive means in proportional controlling relation to said cycler means to thereby adjust said cycler means in a manner to cause cycling operation of said cycler when said load varies below a predetermined value.

5. Control apparatus for a heating system comprising proportionally adjustable means for regulating the supply of heat to said system, means responsive to heat load for proportionally adjusting said adjustable means, cyclically operable means connected to override said adjustable means in a manner to terminate said supply of heat in one portion of its cyclic operation and to restore said adjustable means to control in the other portion of its cyclic operation, and means connecting said load responsive means in controlling relation to said cyclically operable means for adjusting said cyclically operable means in a manner to make said cyclically operable means operative only when said heat load varies below a predetermined value.

6. Control apparatus for a steam heating system including a motor actuated steam valve, a pressure responsive device arranged to respond to the pressure of the steam delivered through said valve and connected to control said valve in a manner to maintain the delivered steam at a predetermined pressure value, a motor for adjusting said device to maintain other values of steam pressure, means responsive to a condition indicative of the heating load on the system connected to said motor for causing it to adjust said device in a manner to maintain a pressure value suitable for the heating load down to a predetermined low value of pressure below which good steam distribution in the system cannot be maintained, and cycler means adjusted by said motor and connected in controlling relation to said motor actuated valve for controlling said steam valve by intermittently closing the same when the heating load is light enough to indicate a need for a pressure below said low value, the drop in pressure caused by closure of the valve causing an initial wider opening of the valve when it is permitted to open by the cycler means to thereby restore the pressure called for by the load responsive means, the initial wider opening of the valve aiding in the proper distribution of the steam.

7. Temperature control apparatus comprising in combination, a motor actuated flow control device, adjustable apparatus responsive to a condition affected by operation of said device connected in controlling relation to said device for maintaining predetermined values of said condition, motor means for adjusting said apparatus, means responsive to a condition indicative of temperature changing load connected to control said motor means in a manner to adjust said apparatus to maintain a value of the condition affected by operation of said device suitable for the temperature changing load, control means proportionally adjusted by said motor means, and cyclically operable means regulated by said control means connected in controlling relation to said device for cyclically operating said device only when the values of said condition determined by said load responsive means tend to be within a predetermined range.

8. Control apparatus for a conditioning system comprising proportionally adjustable means for regulating the supply of a conditioning medium for said system, unitary means responsive to a condition indicative of conditioning load for adjusting said adjustable means, and adjustable cyclically operable means adjusted in accordance with said condition connected in a manner to override said proportionally adjustable means when said condition indicative of conditioning load is within a predetermined low range of values.

9. Apparatus for controlling a steam heating system including proportional adjustable means for regulating the pressure conditions in said system, means proportionally responsive to the heat load for the system, means operatively connecting said load responsive means to said adjustable means for proportionally varying said steam pressure conditions in accordance with load requirements, cycler means also adjusted by said load responsive means and constructed and arranged to cyclically operate only when said load varies below a predetermined low value, and means connecting said cycler means to said adjustable means for intermittent operation thereof.

10. Control apparatus comprising a device to be controlled, condition responsive means connected in proportional controlling relation to said device, means proportionally responsive to a condition indicative of condition changing load connected in proportional controlling relation to said condition responsive means, intermittently operable means also proportionally adjusted and controlled by said means responsive to a condition indicative of load, and means connecting said intermittently operable means in control of said device in a manner to effect two position control of the same.

11. In a condition controlling system, means responsive to a condition indicative of a need for operation of said system, a cycler comprising an electronic amplifier, a relay operated by said amplifier, a normally balanced network circuit having an output terminal connected to said amplifier, said circuit including a temperature responsive resistor, means for heating said resistor, an energizing circuit for said heating means controlled by said relay, said resistor operating to unbalance said network circuit when heated by said heating means, the unbalance being in a direction tending to cause deenergization of said relay, an adjustable circuit means connected to another output terminal of said network circuit for biasing said network circuit in a direction opposite to the unbalance caused by said resistor when heated, and means connecting said condition responsive means in controlling relation to said adjustable circuit.

12. In a condition controlling system; a device to be controlled; condition responsive means connected in controlling relation to said device; and a cycler adjusted by said condition responsive means, said cycler comprising an electronic amplifier, a relay operated by said amplifier, a normally balanced network circuit having an output terminal connected to said amplifier, said circuit including a temperature responsive resistor, means for heating said resistor, an energizing circuit for said heating means controlled by said relay, said resistor operating to unbalance said network circuit when heated by said heating means, the unbalance being in a direction tending to cause deenergization of said relay, circuit means adjustable by said condition responsive means connected to another output terminal of said network circuit for biasing said network circuit in a direction opposite to the unbalance caused by said resistor when heated, and means for connecting said cycler in control of said device.

13. Control apparatus for a heating system including means for proportionally controlling the supply of heating medium to the system, a proportional condition responsive device arranged to respond to a condition indicative of the amount of said medium delivered by said supplying means and connected to proportionally control said supplying means in a manner to maintain said condition at a predetermined value, a motor for adjusting said device to maintain other values of said condition, means proportionaly responsive to a condition indicative of the heating load on the system connected to said motor for causing it to proportionally adjust said device in a manner to maintain a condition value suitable for the heating load, cycler means also proportionally adjusted by said motor and connected to control said supplying means in an on-off manner, and manual cycler adjusting means, said manual adjusting means determining the point at which the cycler assumes on-off control of said supplying means.

JAMES S. LOCKE.
DWAYNE J. NOGGLE.

References Cited in the file of this patent

UNITED STATES PATENTS

| Number | Name | Date |
|---|---|---|
| 1,934,504 | Jennings | Nov. 7, 1933 |
| 1,997,559 | Hajek | Apr. 9, 1935 |
| 2,073,326 | Taylor | Mar. 9, 1937 |
| 2,140,486 | Turner | Dec. 13, 1938 |
| 2,231,696 | Wolfe | Feb. 11, 1941 |
| 2,434,941 | Machlet | Jan. 27, 1948 |
| 2,482,820 | Wolfson et al. | Sept. 27, 1949 |
| 2,487,556 | Jenkins | Nov. 8, 1949 |

FOREIGN PATENTS

| Number | Country | Date |
|---|---|---|
| 444,673 | Great Britain | Mar. 25, 1936 |